(12) United States Patent
Kim et al.

(10) Patent No.: US 10,722,014 B2
(45) Date of Patent: Jul. 28, 2020

(54) PROTECTION COVER

(71) Applicant: SAMSUNG ELECTRONICS CO., LTD., Suwon-si (KR)

(72) Inventors: Ik-Sang Kim, Seoul (KR); Tae-Wan Kim, Seoul (KR); Bum-Soo Park, Gwangmyeong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/092,502

(22) PCT Filed: Apr. 11, 2017

(86) PCT No.: PCT/KR2017/003921
§ 371 (c)(1),
(2) Date: Oct. 10, 2018

(87) PCT Pub. No.: WO2017/179895
PCT Pub. Date: Oct. 19, 2017

(65) Prior Publication Data
US 2019/0159561 A1 May 30, 2019

(30) Foreign Application Priority Data
Apr. 12, 2016 (KR) .................. 10-2016-0045041

(51) Int. Cl.
*A45C 11/00* (2006.01)
*A45C 13/00* (2006.01)
(Continued)

(52) U.S. Cl.
CPC .............. *A45C 11/00* (2013.01); *A45C 13/00* (2013.01); *A45C 13/005* (2013.01); *E05D 11/08* (2013.01);
(Continued)

(58) Field of Classification Search
USPC .......................... 206/45.2, 45.23, 45.24, 320
See application file for complete search history.

(56) References Cited

U.S. PATENT DOCUMENTS 7,188,726 B2 * 3/2007 Lin ........................ B25H 3/003
206/373
7,810,644 B2 * 10/2010 Fraillon ................. A45D 40/24
132/295
(Continued)

FOREIGN PATENT DOCUMENTS

KR    10-2010-0030039    3/2010
KR    10-0993221         11/2010
(Continued)

OTHER PUBLICATIONS

International Search Report for PCT/KR2017/003921, dated Jul. 18, 2017, 4 pages.
(Continued)

Primary Examiner — Jacob K Ackun
(74) Attorney, Agent, or Firm — Nixon & Vanderhye, P.C.

(57) ABSTRACT

Various examples related to a protection cover for protecting an electronic device are disclosed. According to one example, the protection cover includes a first cover part located at a front surface of the electronic device; a second cover part connected to the first cover part such that a rear surface of the electronic device is located thereon; a holding part which is rotatably connected between the first and second cover parts, allows at least a portion of the rear surface of the electronic device to be loaded thereon, and, simultaneously, holds the electronic device at various angles by using frictional force during a rotation thereof; and a supporting part loaded on the second cover part so as to rotatably support the holding part. In addition, various other examples are possible.

9 Claims, 10 Drawing Sheets

(51) Int. Cl.
*H04M 1/02* (2006.01)
*E05D 11/08* (2006.01)
*H04B 1/3888* (2015.01)

(52) U.S. Cl.
CPC ............ *H04B 1/3888* (2013.01); *H04M 1/02* (2013.01); *A45C 2011/001* (2013.01); *A45C 2011/002* (2013.01); *A45C 2011/003* (2013.01); *A45C 2200/15* (2013.01)

(56) References Cited

U.S. PATENT DOCUMENTS

| | | | | |
|---|---|---|---|---|
| 8,708,140 | B2* | 4/2014 | Liu | ........................ A45C 11/00 206/320 |
| 2007/0012582 | A1* | 1/2007 | Lau | ..................... G11B 33/045 206/308.1 |
| 2013/0075281 | A1 | 3/2013 | Diebel et al. | |
| 2014/0197058 | A1* | 7/2014 | Huet | ..................... A45C 11/24 206/320 |
| 2015/0027912 | A1* | 1/2015 | Liu | ....................... G06F 1/1628 206/45.24 |

FOREIGN PATENT DOCUMENTS

| | | |
|---|---|---|
| KR | 10-2012-0116332 | 10/2012 |
| KR | 10-2014-0007049 | 1/2014 |
| KR | 10-1443007 | 9/2014 |
| KR | 10-1472033 | 12/2014 |
| KR | 10-2015-0107230 | 9/2015 |
| KR | 10-2015-0118754 | 10/2015 |

OTHER PUBLICATIONS

Written Opinion of the ISA for PCT/KR2017/003921, dated Jul. 18, 2017, 6 pages.

* cited by examiner

PROTECTION COVER

CROSS-REFERENCE TO RELATED APPLICATION(S)

This application is a National Phase Entry of PCT International Application No. PCT/KR2017/003921, which was filed on Apr. 11, 2017, and claims priority to Korean Patent Application No. 10-2016-0045041, which was filed on Apr. 12, 2016, the contents of which are incorporated herein by reference.

BACKGROUND

1. Field

Various embodiments of the present invention relate to protection covers, e.g., covers for protecting electronic devices.

2. Description of the Related Art

MP3 players, portable multimedia players (PMPs), tablet PCs, the Galaxy Tab, smartphones, the IPad, and e-book terminals are among various electronic gadgets that are now available and that allow their users to enjoy diverse media contents in the palm of their hand.

Users may communicate with others while carrying portable electronic devices. Portable electronic devices include a display unit, an antenna device, an input/output device, and a data transmission/reception device.

As such, portable electronic devices have various functions, including music and video playing, game playing, camera functionality, scheduling, and dictionary functionality, in addition to their originally intended functions, in order to meet various user needs as information communication technology sharply advances and further provide the functionality of searching various data and adding new applications.

As portable electronic devices become more compact and lightweight, they can be used while users carry them in their hand, pocket, or bag and are thus are at risk of being lost or broken. Thus, portable electronic devices are wrapped with protection covers when in use.

A protection cover includes a front cover and a rear cover to detachably fit over a portable electronic device.

A protection cover may, as its basic functionality, safely receive the portable electronic device and protect the portable electronic device against impacts or scratches. A protection cover may be opened and closed via magnets provided therein, in which case the magnets may arrange the protection cover at various angles, and thus, the protection cover may serve as a stand. Recently, the availability of multimedia content for portable communication devices has been steadily increasing, and users have been consuming more media. For viewing purposes, users let their portable communication device stand on a table or desk by using the protection cover rather than holding it in their hand.

For example, in order to stand, the protection cover may be bent so that parts of the cover support each other. As another example, the protection cover may be placed at an angle by using a pen or an additional accessory.

SUMMARY

Conventional protection covers may exhibit bending structures (e.g., bending grooves) when standing, which cause them to look unappealing. Further, such a bending structure puts the protection cover at a single angle, thus rendering it difficult for the user to put it at their desired angle. In other words, for the user to put the protection cover at their desired angle, multiple bending structures need to be formed on the protection cover, and this may spoil the design of the protection cover and cause it to look untidy.

Thus, the need exists for a device that allows an electronic device to freely be supported at various angles such that even when the electronic device is set upright, the outer look is not spoiled.

Thus, according to various embodiments of the present invention, there is provided a protection cover that allows an electronic device to be supported freely at various angles using a frictional force upon the rotation between its first and second cover parts.

According to various embodiments of the present invention, a protection cover configured to protect an electronic device may comprise a first cover part located on a front surface of the electronic device, a second cover part connected with the first cover part and located on a rear surface of the electronic device, and a mounting part rotatably connected between the first cover part and the second cover part and configured to seat the rear surface of the electronic device and to mount the electronic device at various angles using a frictional force upon rotation.

According to various embodiments of the present invention, a protection cover configured to protect an electronic device may comprise a first cover part located on a front surface of the electronic device, a second cover part connected with the first cover part and located on a rear surface of the electronic device, a mounting part rotatably connected between the first cover part and the second cover part and configured to seat a rear surface of at least a portion of the electronic device and to mount the electronic device at various angles using a frictional force upon rotation, and a supporting part seated on the second cover part and configured to rotatably support the mounting part.

According to various embodiments of the present invention, there may be configured a mounting part for mounting the electronic device at various angles using a frictional force upon the rotation between the first and second cover parts of the protection cover, allowing it to be mounted at the user's desired angle, hence enhancing the use of the electronic device while eliminating the need for separate bending structures in the protection cover, thereby allowing for a better design and better impression for the protection cover.

DETAILED DESCRIPTION

Figure 1:
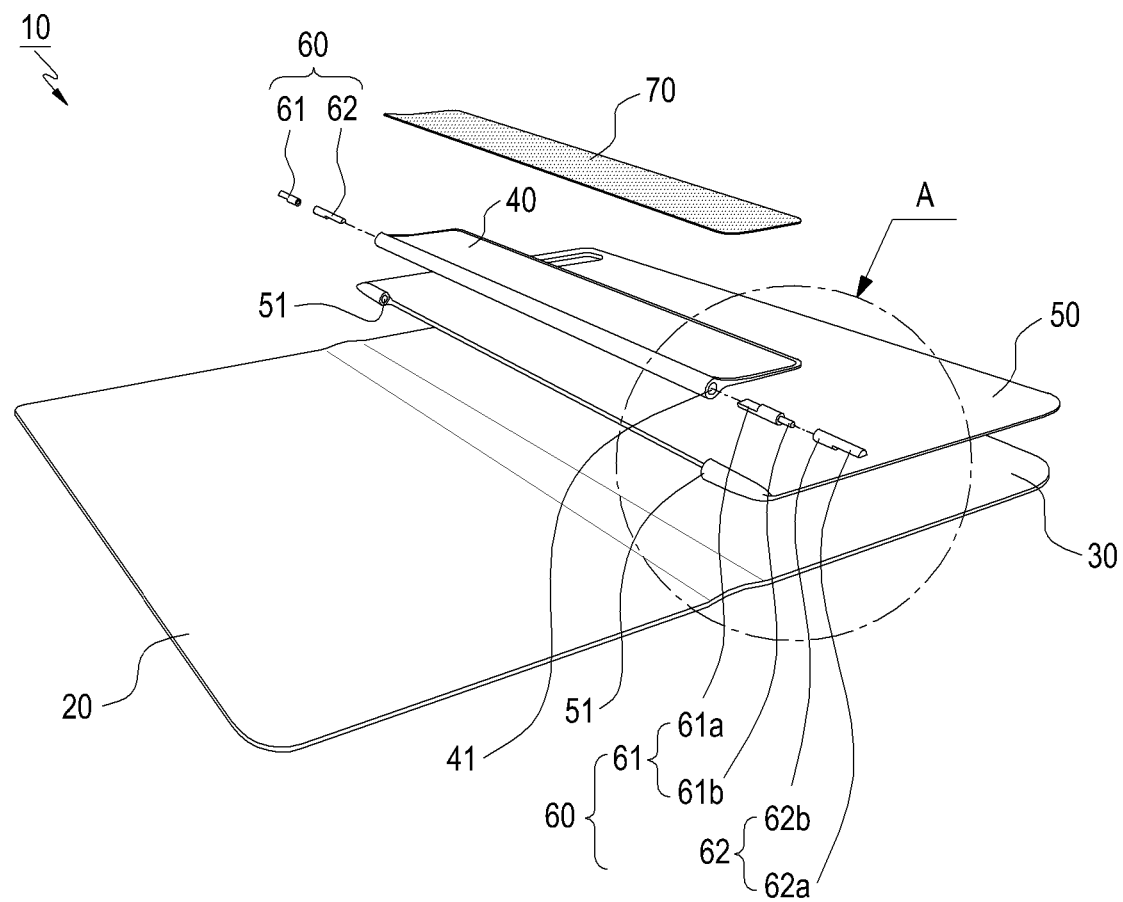
FIG. 1 is an exploded perspective view illustrating a configuration of a protection cover according to various embodiments of the present invention.

The terms used for various embodiments of the present invention are briefly described, and various embodiments of the present invention are then described in detail.

For use in various embodiments of the present invention, common terms widely used as possible have been chosen considering functions in various embodiments of the present invention, but the terms may be varied depending on the intent of one of ordinary skill in the art or case laws or the advent of new technologies. In certain cases, some terms may be arbitrarily selected by the applicant, and in such case, their detailed definitions may be given in the relevant parts of the description of various embodiments of the present invention. Accordingly, the terms used for various embodiments of the present invention should be determined based on their meanings and the overall disclosure, rather than by the terms themselves.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure.

An electronic device according to various embodiments of the present invention is described below. First, examples of applications of the electronic device according to an embodiment of the present invention may include all mobile communication terminals operated based on communication protocols corresponding to various communication systems, video phones, e-book readers, laptop computers, netbook computers, PDAs, PMPs, MPEG1-audio layer-3 (MP3) players, mobile medical devices, cameras, wearable devices (e.g., electronic glasses or such head-mounted devices (HMDs), electronic clothing, electronic bracelets, electronic necklaces, electronic appcessories, electronic tattoos, or smart watches), or all information communication devices and multimedia devices and application devices therefor.

According to some embodiments, the electronic device may be a smart home appliance. For example, examples of the smart home appliance may include, but is not limited to, a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to an embodiment of the present invention, examples of the electronic device may include, but is not limited to, various medical devices (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), avionics, security devices, vehicular head units, industrial or home robots, automatic teller machines (ATMs), or point of sales (POS) devices.

According to various embodiments of the disclosure, examples of the electronic device may at least one of part of a piece of furniture or building/structure with a communication functionality, an electronic board, an electronic signature input device, a projector, or various measurement devices (e.g., devices for measuring water, electricity, gas, or electromagnetic waves).

According to an embodiment of the present invention, the electronic device may be one or a combination of the above-listed devices or appliances. According to an embodiment of the present invention, the electronic device may be a flexible device. According to an embodiment of the present invention, the electronic device is not limited to the above-listed devices or appliances.

According to various embodiments of the present invention, a protection cover provided in an electronic device 1 (shown in FIG. 8B) is described. First, according to an embodiment of the present invention, the display unit 2 (shown in FIG. 8B) of the electronic device 1 may be formed of any one of a touchscreen panel, an LCD, an organic light emitting diode (OLED), and flexible display units. The display unit 2 of the electronic device 1, although described by taking as an example a touchscreen panel, an LCD, an organic light emitting diode (OLED), and flexible display units, is not limited thereto. That is, the display unit 2 may be any display unit that is capable of video playing and receiving touch inputs.

According to various embodiments of the present invention, the display unit 2 may be formed of a capacitive touchscreen panel. An electronic device 1 with a capacitive touchscreen panel is briefly described. The capacitive touchscreen panel may detect the position of a touch on the display unit 2 using a variation in capacitance between the sensor electrode (not shown) and the driving electrode (not shown). For example, the capacitance is sequentially measured at multiple crossings between multiple sensor electrodes arrayed horizontally and multiple driving electrodes arrayed vertically, and a variation in capacitance at a particular point is thus detected.

Further, recent display units may be rendered to have a minimized bezel area to enlarge the display unit, present an appealing design, provide a flexible display unit, or implement a convex or concave display unit.

That is, the surrounding portion of the display unit may be bent, allowing the screen area to be expanded to a side portion and used. As the screen area of the display unit is bent to expand up to the side portion, more of the screen area may be used or a separate screen in the side portion may be used, and thus a more appealing look may be presented in light of the design. In other words, the display unit may include a first view area and a second view area provided on both sides of the first view area. According to various embodiments of the present invention, described is a protection cover to protect an electronic device including a display unit with first and second view areas.

Figure 2:
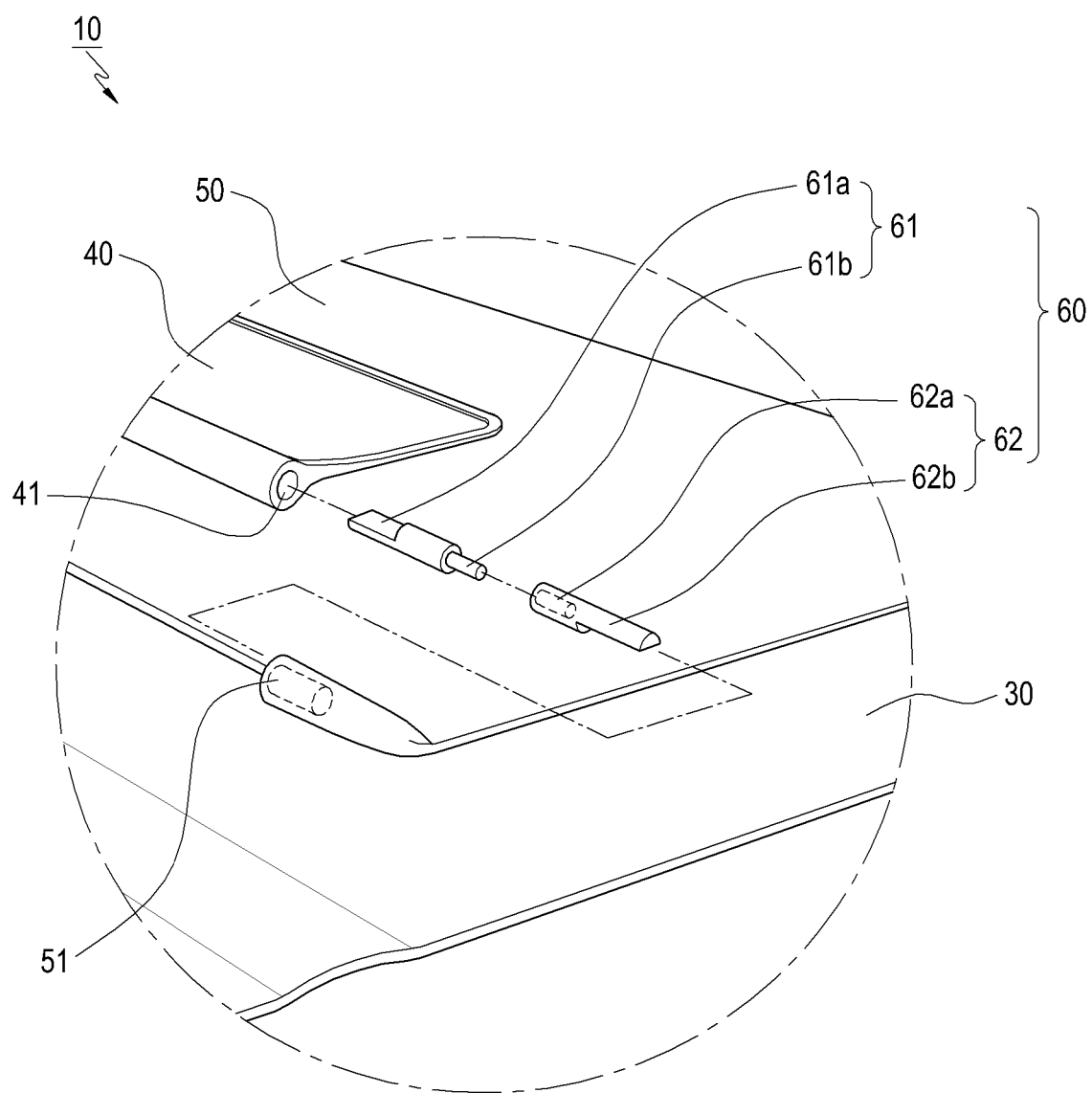
FIG. 2 is an enlarged, exploded perspective view of portion A of FIG. 1.

FIG. 1 is an exploded perspective view illustrating a protection cover 10 (shown in FIG. 1) according to various embodiments of the present invention, and FIG. 2 is an enlarged, exploded perspective view illustrating the configuration of a protection cover 10 according to various embodiments of the present invention.

Referring to FIGS. 1 and 2, the protection cover 10 may include a first cover part and second cover part, a mounting part 40, and a supporting unit 50. For example, the first cover part 20 may be connected with the second cover part 30, which is described below, while being simultaneously positioned on the front surface of the electronic device 1 (shown in FIG. 8B). The second cover part 30 may be connected with the first cover part 20 and may be positioned on the rear surface of the electronic device 1. The mounting part 40 may be rotatably connected with the first and second cover parts 20 and 30 in order to seat the rear surface of at least a portion of the electronic device 1 while mounting the electronic device 1 at various angles by using a frictional force produced when the mounting part 40 rotates. The supporting part 50 may be seated on an inner surface of the second cover part 30 in order to rotatably support the mounting part 40.

As such, a mounting hinge part 60 may be provided between the mounting part 40 and the supporting part 50 in order to mount the mounting part 40 at various angles while simultaneously coupling the same. For example, the mounting hinge part 60 may mount the electronic device 1, with the rotational angle adjusted freely, upon rotating the mounting part 40 that has the rear surface of the electronic device 1 seated thereon, allowing the mounting angle of the electronic device 1 to be freely set, thus facilitating the use of the protection cover 10 and enhancing the user's convenience.

According to various embodiments of the present invention, the mounting hinge part 60 is described below in greater detail.

Figure 3A:
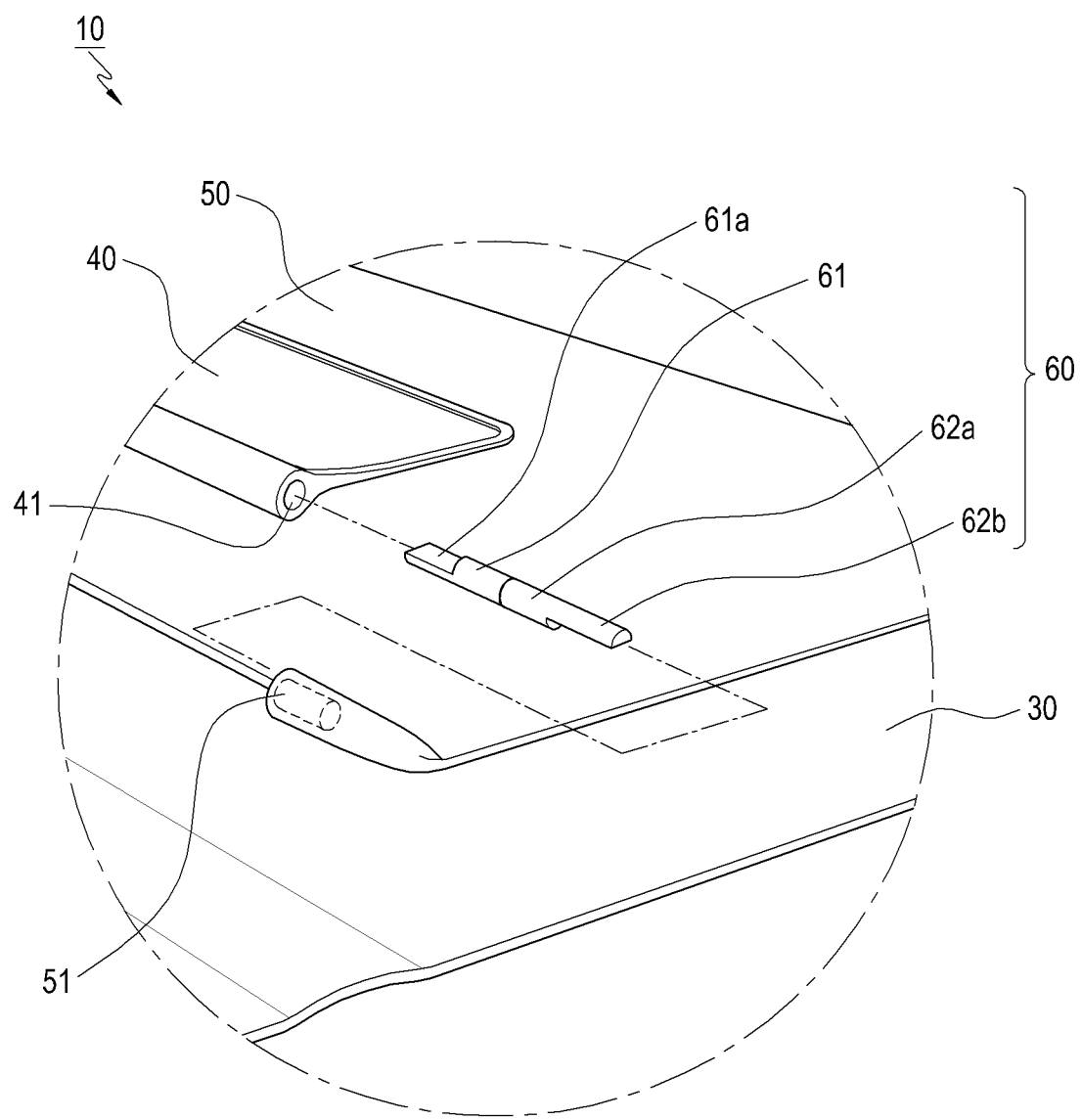
FIG. 3A is an enlarged, exploded perspective view of portion A of FIG. 1, which illustrates a mounting hinge part among components of the protection cover.
Figure 3B:
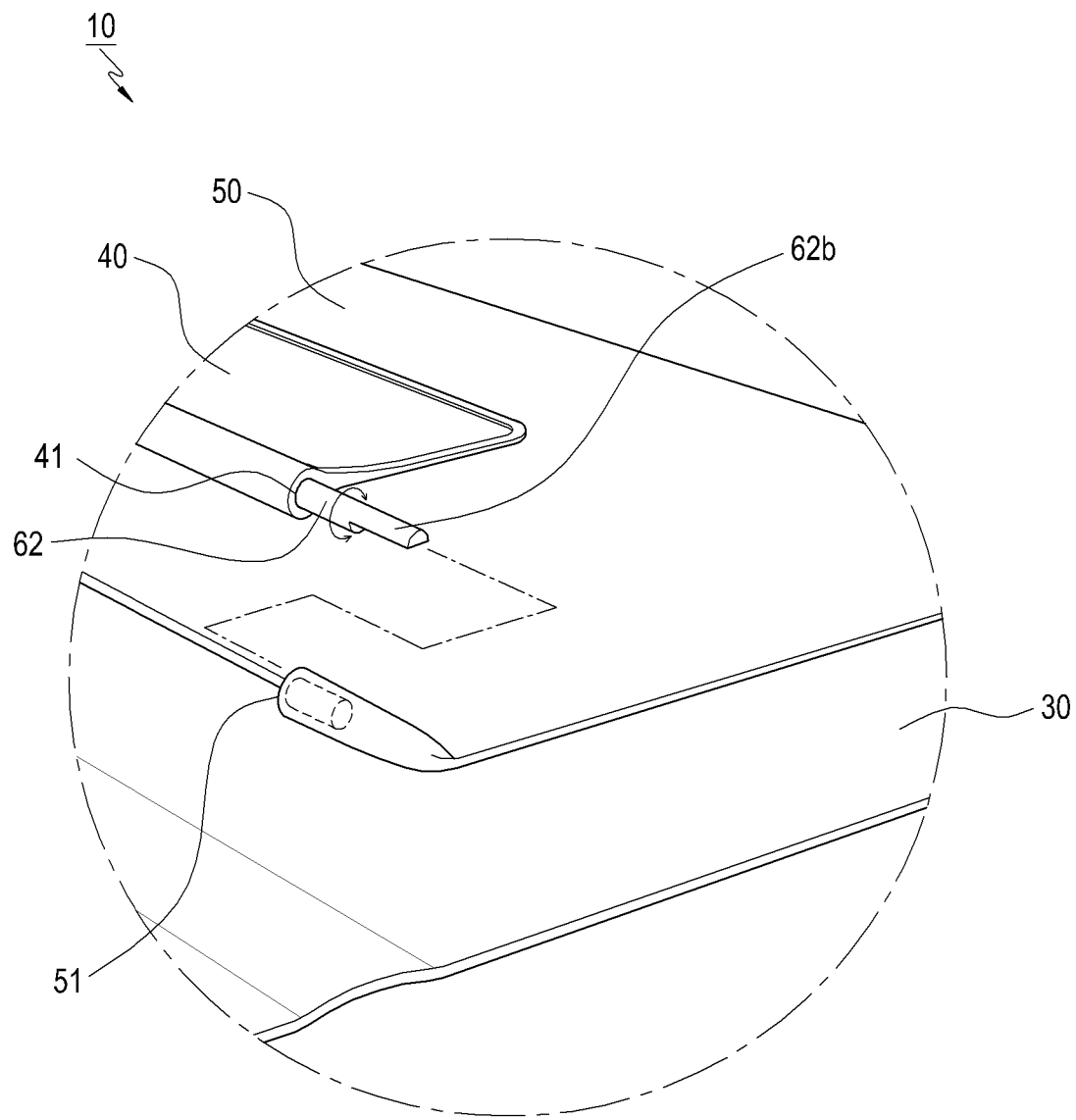
FIG. 3B is an enlarged, exploded perspective view of portion A of FIG. 1, which illustrates a state of coupling, with a mounting part, of a mounting hinge part among components of the protection cover.
Figure 4:
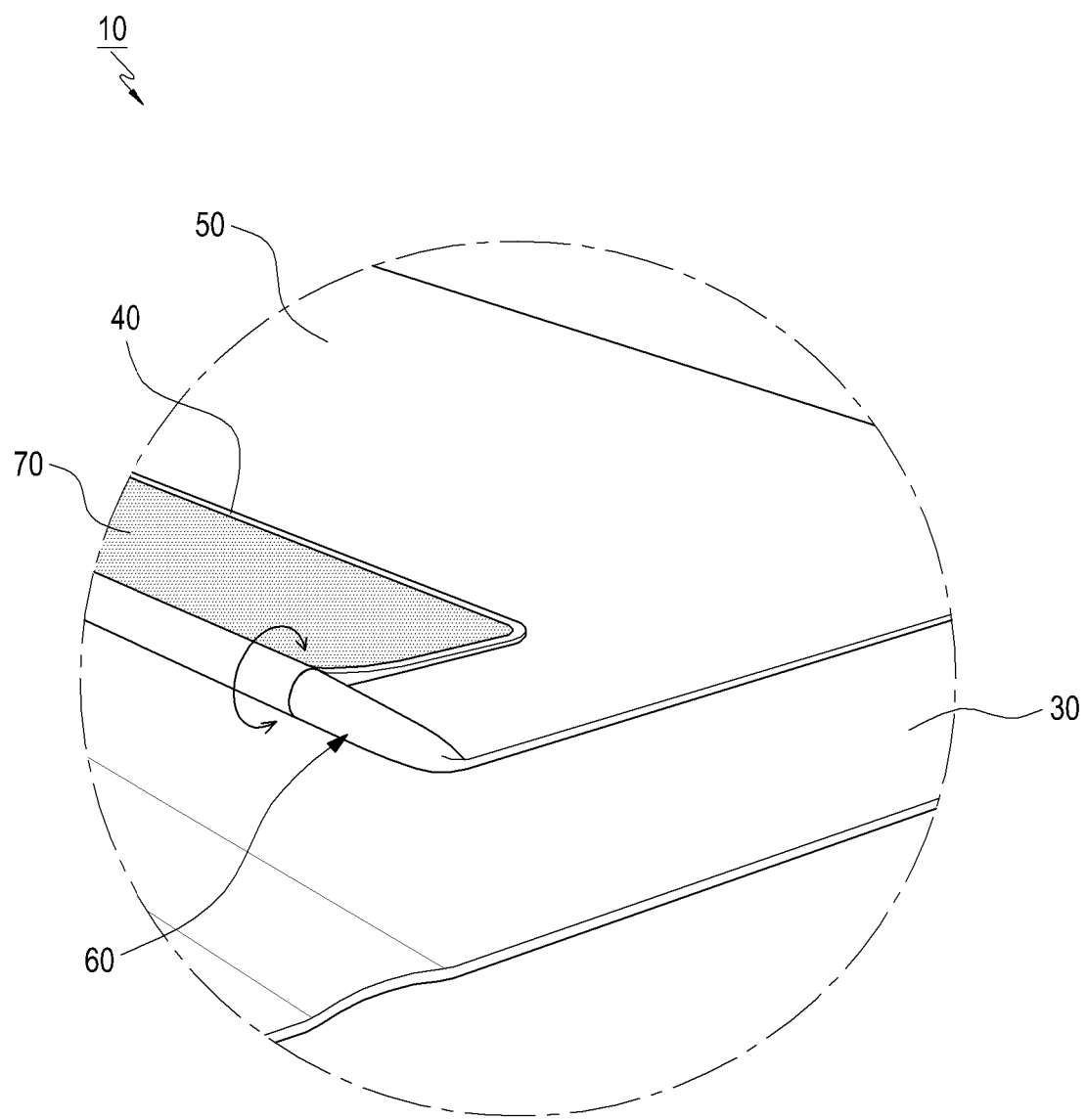
FIG. 4 is a perspective view illustrating a state of a protection cover before operation according to various embodiments of the present invention.

FIG. 3A is an exploded perspective view illustrating the configuration of a mounting hinge part 60 among components of a protection cover 10 according to various embodiments of the present invention, FIG. 3B is a perspective view illustrating a state of coupling of a mounting hinge part 60 with a mounting part 40 among the components of a protection cover 10 according to various embodiments of the present invention, and FIG. 4 is a perspective view illustrating a state of a protection cover 10 before operation according to various embodiments of the present invention.

First, as shown in FIG. 2, the mounting hinge part 60 may include a pair of first members 61 and a pair of second hinge members 62. For example, the pair of first hinge members 61 may be coupled and fixed to both sides of the mounting part 40 so as to be rotatably coupled with the pair of second hinge members 62. The pair of second hinge members 62 may be coupled and fastened to a pair of side arms of the supporting part 50 in order to adjust the rotation of the pair of first hinge members 61 so as to provide various mounting angles for the mounting part using a frictional force produced as the pair of second hinge members 62 rotatably couple with the pair of first hinge members 61.

As shown in FIGS. 2, 3A, and 3B, the first hinge member 61 may have a first fixing member 61a at a first end thereof and a rotational protrusion 61b at a second end thereof, which is opposite to the first end, wherein the first fixing member 61a is coupled and fixed to a first fixing hole 41 formed at each side of the mounting part 40, and the rotational protrusion 61b is rotatably coupled to a rotational groove 62b formed in the second hinge member 62 described below. The second hinge member 62 may have a second fixing member 62a at a first end thereof and a rotational groove 62b at a second end thereof, which is opposite to the first end, wherein the second fixing member 62a is coupled and fixed to a second fixing hole 51 formed at each of the pair of side arms of the supporting part 50, and the rotational groove 62b is coupled to the hinge protrusion 61b and produces a frictional force against the hinge protrusion 61b so as to be able to adjust the rotation of the second hinge member. For example, as shown in FIG. 4, the rotational protrusion 61b formed at the second end of the first hinge member 61 may be rotatably coupled with the rotational groove 62b formed at the second end of the second hinge member 62, and the first fixing member 61a formed at the first end of the first hinge member 61 may be coupled and fixed to the first fixing hole 41 of the mounting part 40 in a state in which the second fixing member 62a formed at the first end of the second hinge member 62 may be coupled and fixed to the second fixing hole 51 formed at each side arm of the supporting part 50. Accordingly, the mounting part 40 may be rotatably coupled with the pair of side arms of the supporting part 50.

For example, the rotational protrusion 61b of the first hinge member 61 may be engaged and coupled with the rotational groove 62b of the second hinge member and may create a frictional force when the rotational protrusion 61b rotates. In this state, if the electronic device 1 (shown in FIG. 8B) is rotated, the rotational protrusion 61b and mounting part 40 seated on the rear surface of the electronic device 1 (shown in FIG. 8B) are rotated as well, and if the electronic device 1 is mounted at the user's desired angle, the rotation of the mounting part 40 may be stopped by the rotational protrusion 61b and the rotational groove 62b. The mounting part 40 may be rotated and stopped from rotation at the user's desired angle by the frictional force of the rotational protrusion 61b. If the first cover part 20 stops at the user's desired angle, the mounting part 40 and the rotational protrusion 61b also stop, and at this time, the mounting part 40 may be allowed to be put at a desired angle while the rotational protrusion 61b simultaneously stops at the rotational groove 62b. In this state, the user may view various multimedia contents through the electronic device 1 (shown in FIG. 8B) at a desired angle.

As an example, the mounting part 40 may be formed to be smaller than the first and second cover part 20 and 30. For example, in the state in which the first and second cover parts 20 and 30 are closed, the mounting part 40 is hidden by the first and second cover parts 20 and 30, and when, upon use, the first cover part 20 is rotated from the second cover part 30, the mounting part 40 may be exposed to the outside. Accordingly, when the first and second cover parts 20 and 30 are not used, the mounting part 40 is hidden, allowing the protection cover 10 to look clean.

The supporting part 50 may be formed of polyurethane (PU). The supporting part 50, although being formed of polyurethane (PU), as an example, is not limited thereto.

That is, various materials other than polyurethane (PU) may be applicable to the supporting part 50 as long as the materials are supportable against the second cover part 30. For example, the supporting part 50 may be formed of urethane or acrylic.

Figure 8A:
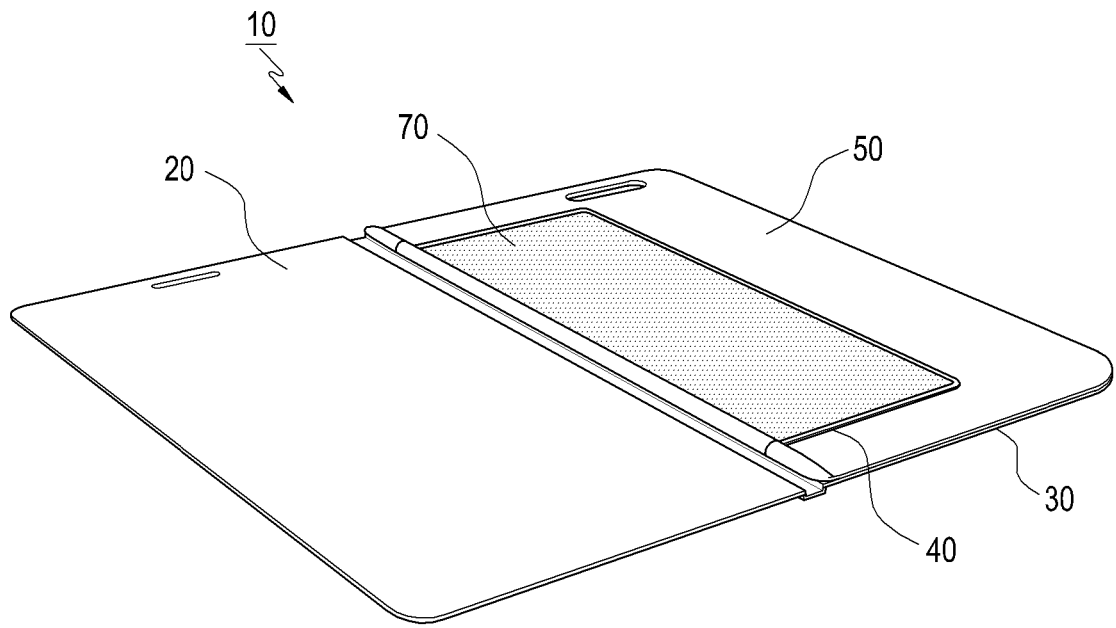
FIG. 8A is a perspective view illustrating a state in which a first cover part is rotated before an electronic device is covered with a protection cover according to various embodiments of the present invention.
Figure 8B:
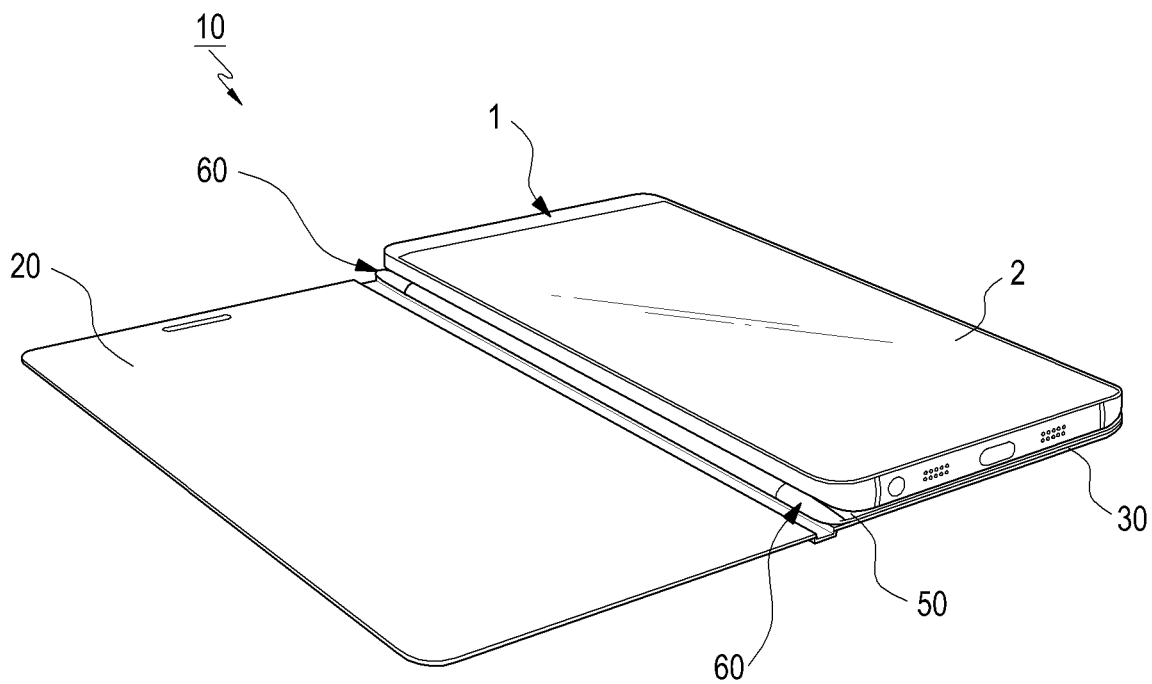
FIG. 8B is a perspective view illustrating a state in which a first cover part is rotated, with an electronic device covered with a protection cover according to various embodiments of the present invention.

As another example, a seating member 70 may be provided in the mounting part 40 in order to seat the rear surface of the electronic device 1 (shown in FIG. 8B). For example, the seating member may prevent the electronic device 1 from being separated or escaping after the rear surface of the electronic device 1 has been seated on the mounting part 40. Accordingly, the seating member may include a suction sheet. For example, the suction sheet may enhance the attractability of the mounting part 40 and the rear surface of the electronic device 1, and in this state, may prevent the electronic device 1 and the mounting part 40 from escaping or being separated when the mounting part 40 rotates at various angles while also enhancing fixability.

As another example, a hinge insertion space 80 may be provided between the first and second cover parts 20 and 30 to allow for insertion of the mounting hinge part 60.

Figure 5:
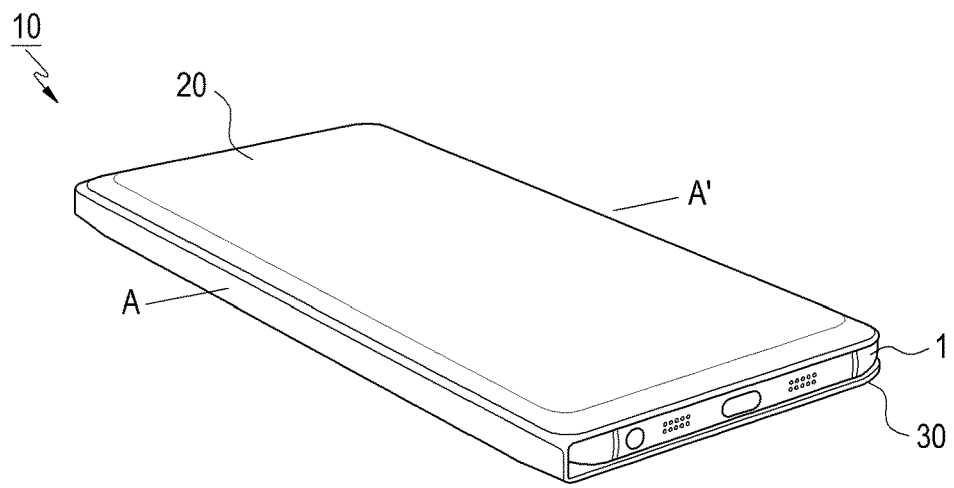
FIG. 5 is a perspective view illustrating a state of a protection cover before operation according to various embodiments of the present invention.
Figure 6:
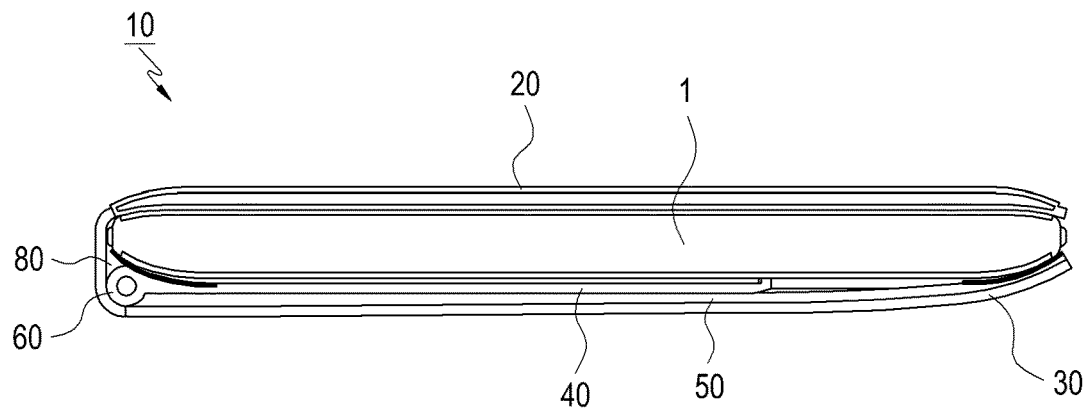
FIG. 6 is a cross-sectional view taken along line A-A' of FIG. 5.
Figure 7:
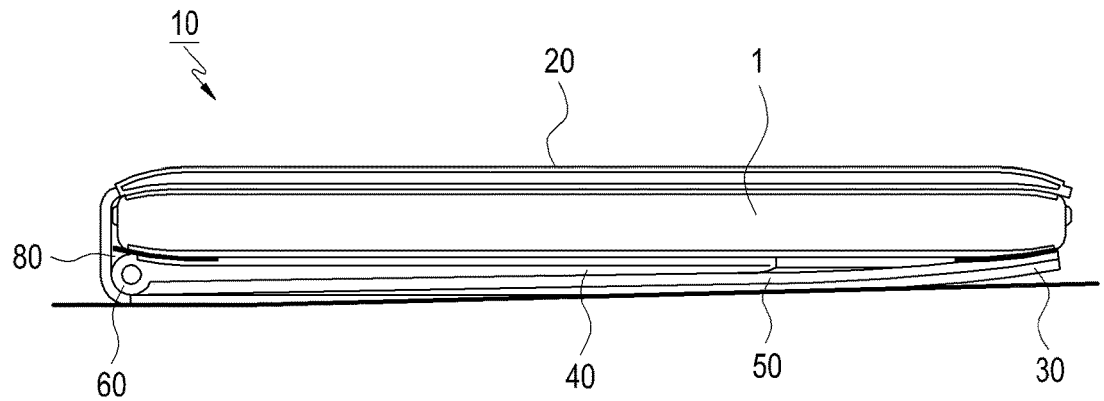
FIG. 7 is a side cross-sectional view illustrating a state in which a protection cover fits over another electronic device according to various embodiments of the present invention.

FIG. 5 is a perspective view illustrating a state of a protection cover 10 before operation according to various embodiments of the present invention. FIG. 6 is a cross-sectional view taken along A-A' of FIG. 5. FIG. 7 is a side cross-sectional view illustrating a state in which a protection cover 10 is mounted on another electronic device 1 according to various embodiments of the present invention.

Figure 9A:
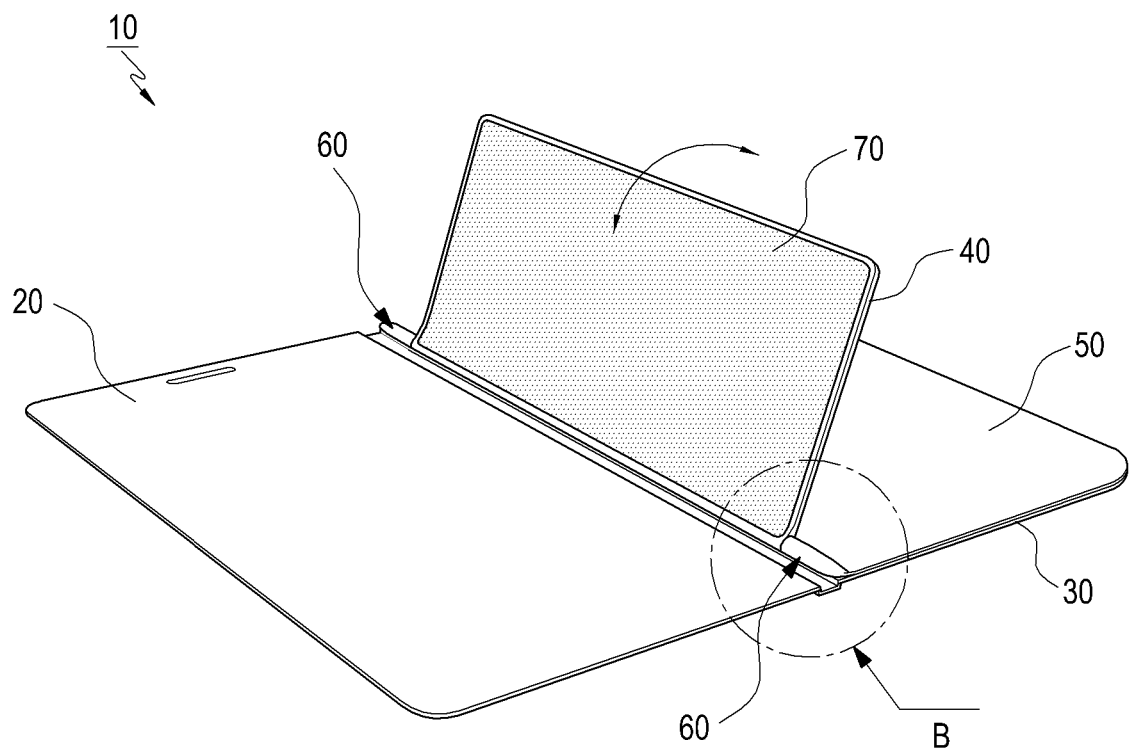
FIG. 9A is a perspective view illustrating a state in which a mounting part is rotated before an electronic device is covered with a protection cover according to various embodiments of the present invention.

In FIGS. 5 and 6, the state of the first and second cover parts 20 and 30 before use is shown. The first cover part 20 may face the front surface of the electronic device 1 (shown in FIG. 8B), and the second cover part 30 may be positioned on the rear surface of the electronic device 1 (shown in FIG. 8B). As shown in FIG. 9A, the mounting hinge part 60 may be provided in the hinge insertion space 80 formed between the first and second cover parts 20 and 30. For example, if the first and second cover parts 20 and 30 are coupled with the electronic device 1, the hinge insertion space 80 may be created at the first and second cover parts 20 and 30 by the curve formed at both sides of the rear surface of the electronic device 1 (shown in FIG. 8B). Accordingly, the increase in thickness by the coupling between the protection cover 10 and the electronic device 1 (shown in FIG. 8B) may be reduced by inserting the mounting hinge part 60 into the hinge insertion space 80. The protection cover 10 and the electronic device 1 may be slimmed down.

When the rear surface of the electronic device 1 (shown in FIG. 8B) has no curve and is flat, as shown in FIG. 7, the mounting hinge part 60 may be provided in the small hinge insertion space 80 formed between the first and second cover parts 20 and 30. For example, when the hinge insertion space 80 is small, the mounting hinge part 60 may be provided in the hinge insertion space 80, and the thickness of the first and second cover parts 20 and 30 may be increased.

As such, even when the rear surface of the electronic device 1 (shown in FIG. 8B) is flat, the mounting hinge part 60 may be provided in the small hinge insertion space 80. At this time, the space between the first and second cover parts 20 and 30 may protrude as far as the thickness of the mounting hinge part 60.

According to various embodiments of the present invention, the operation of the protection cover 10 to protect the electronic device 1 is described below in detail.

Figure 9B:
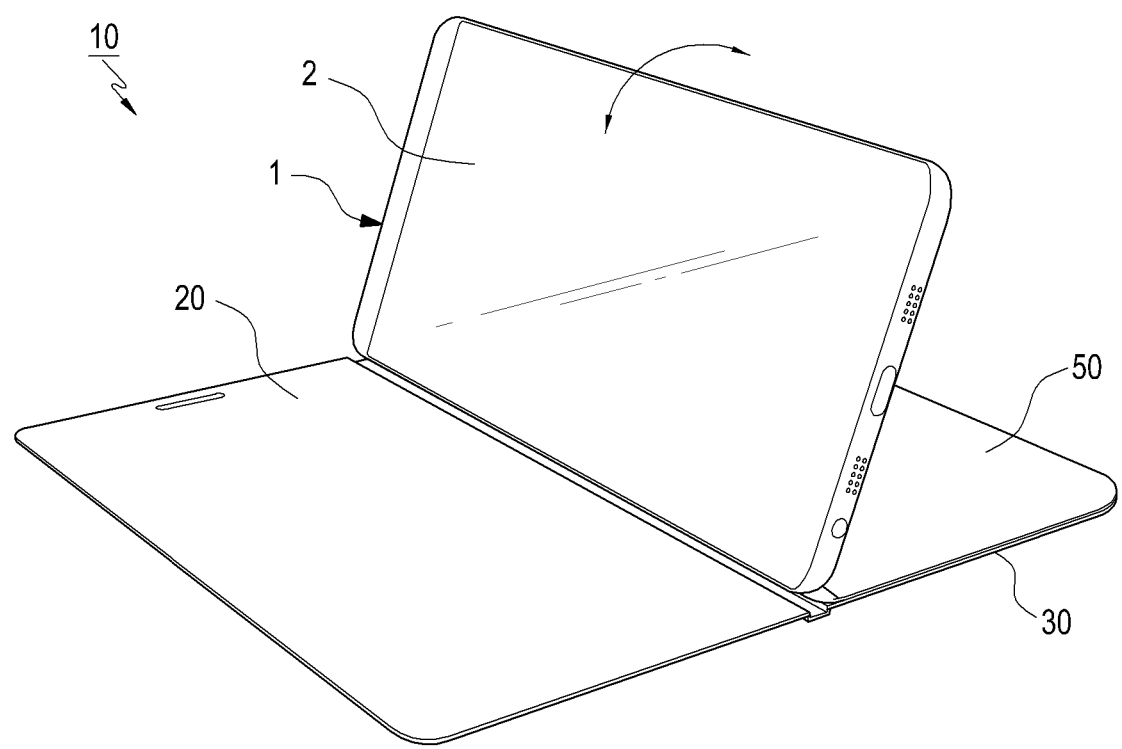
FIG. 9B is a perspective view illustrating a state in which a mounting part is rotated, with an electronic device covered with a protection cover according to various embodiments of the present invention.
Figure 10:
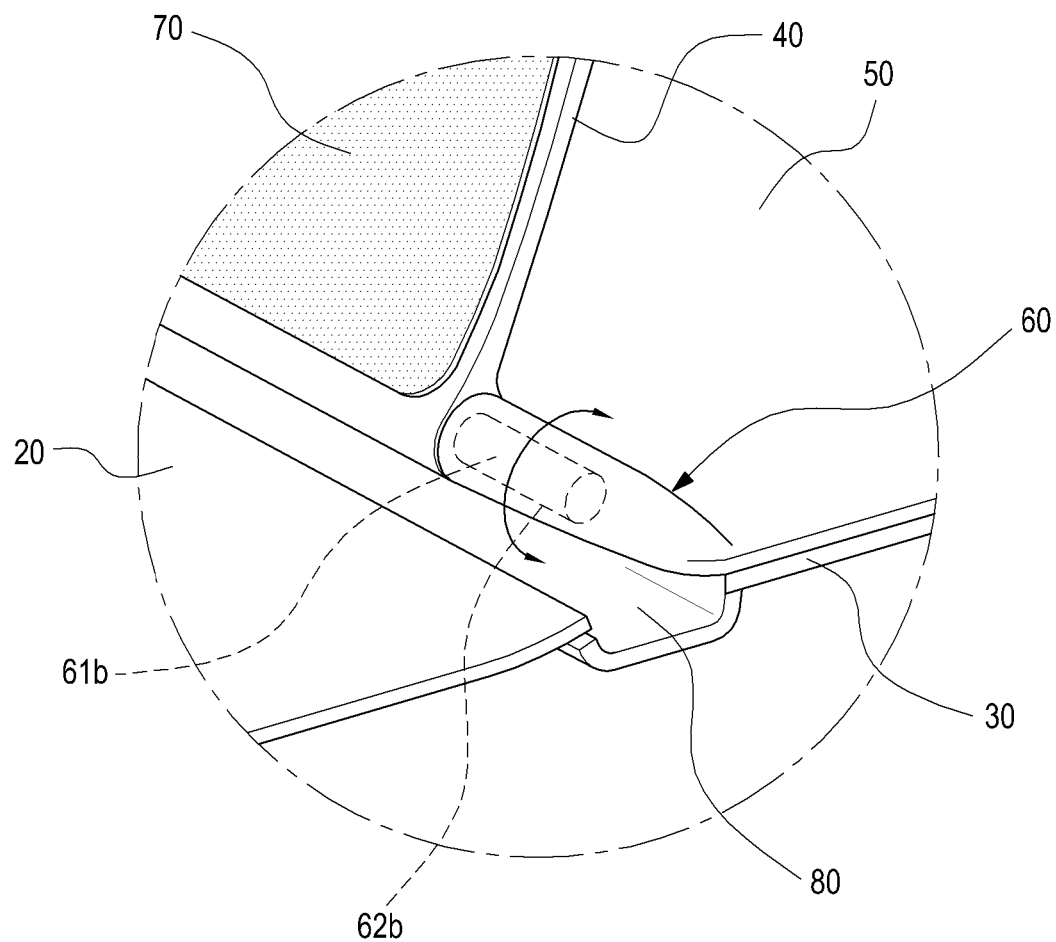
FIG. 10 is an enlarged, perspective view of portion B of FIG. 9A.

FIG. 8A is a perspective view illustrating a state in which a first cover part 20 is rotated before an electronic device 1 is covered with a protection cover 10 according to various embodiments of the present invention. FIG. 8B is a perspective view illustrating a state in which a first cover part 20 is rotated, with an electronic device 1 covered with a protection cover 20, according to various embodiments of the present invention. FIG. 9A is a perspective view illustrating a state in which a mounting part 40 is rotated before an electronic device 1 is covered with a protection cover 10 according to various embodiments of the present invention. FIG. 9B is a perspective view illustrating a state in which a mounting part 40 is rotated, with an electronic device 1 covered with a protection cover 10, according to various embodiments of the present invention. FIG. 10 is an enlarged perspective view illustrating the operational state of a mounting hinge part 60, with an electronic device 1 mounted on a protection cover 10, according to various embodiments of the present invention.

Referring to FIGS. 8A and 8B, the first cover part 20 provided in the protection cover 10 may be rotated and spread from the second cover part 30. As the first cover part 20 rotates, the mounting part 40 provided between the first and second cover parts 20 and 30 may simultaneously be exposed to the outside. As shown in FIG. 8B, the rear surface of the electronic device 1 may be seated on the upper surface of the mounting part 40. At this time, since the mounting part 40 has a seating member 70 to seat the rear surface of the electronic device 1, the rear surface of the electronic device 1 is seated on the seating member 70. In this state, the electronic device 1 is rotated as shown in FIGS. 9A and 9B. At this time, as the electronic device 1 rotates, the mounting part 40 rotates as well, and if the electronic device 1 is allowed to be put at the user's desired angle, the rotation of the mounting part 40 may be stopped by the mounting hinge part 60. The mounting part 40 may be rotated and stopped from rotation at the user's desired angle by the frictional force of the mounting hinge part 60.

If the first cover part 20 stops at the user's desired angle, the mounting part 40 also stops, and at this time, the mounting hinge part 60 may put the mounting part 40 at a desired angle.

In this state, the user may view various multimedia contents through the electronic device 1 at a desired angle.

For example, since the rotational protrusions 61b protruding from both sides of the mounting part 40 are rotatably coupled to the rotational grooves 62b formed in a pair of side arms of the supporting part 50 seated on the second cover part 30, if the mounting part 40 is rotated, the rotational protrusion 61b is also rotated, and the rotational protrusion 61b creates a frictional force in the rotational groove 62b, allowing the rotation of the mounting part 40 to be adjusted to various angles.

As another example, if the electronic device 1 mounted is rotated back to the original position by the user's external force, the mounting part 40 may be rotated together, and may thus be seated in the second cover part 30. At this time, the mounting hinge part 60 may rotate the mounting part 40 and may also adjust the rotation by frictional force.

As set forth above in connection with FIG. 5, the first cover part 20 may be rotated back to be positioned on the front surface of the electronic device 1 while simultaneously closing the first cover part 20. For example, the first cover part 20 is rotated back to get closer to the second cover part 30 and is closed.

As described above, the conventional protection cover (not shown) has bending structures that shape the cover as a triangle and stand. The conventional protection cover may look unappealing by the presence of such bending structures and cannot present various mounting angles.

According to various embodiments of the present invention, the protection cover 10 (shown in FIG. 1), in order to overcome shortcomings, may have the mounting part 40 embedded between the first and second cover parts 20 and 30, and the mounting part 40 may freely adjust the mounting angle by the mounting hinge part 60, thus facilitating mounting to the electronic device 1 (shown in FIG. 8B) and allowing for the protection cover 10 to have a better design.

As another embodiment of the second cover part 30 (shown in FIG. 1) included in the protection cover 10 (shown in FIG. 1), according to various embodiments of the present invention, the second cover part may add a protrusion (not shown) or hook structure (not shown) for fastening the electronic device 1 (shown in FIG. 8B) and may produce a space for a camera or speaker. For example, the second cover part may have a protrusion, and the electronic device may have a hook structure on the rear surface thereof, so that the hook structure of the electronic device is coupled with the protrusion of the second cover part.

As an example, the first cover part 20 (shown in FIG. 1) may have a structure to see through the screen of the electronic device, e.g., a transparent window (not shown), and a Bluetooth device, keyboard, touchpad, or other electrical input devices may be added on the first cover part.

As another example, a magnet (not shown) may be embedded in a portion of the first cover part 20 (shown in FIG. 1) or the second cover part 30 (shown in FIG. 1), inducing a coupling between the cover parts or a coupling between the electronic device and the cover part. For example, if a magnet is embedded in the first cover part, the electronic device and the first cover part may be attached or detached from each other by the magnetic force of the magnet.

It is apparent to one of ordinary skill in the art that the protection covers according to various embodiments of the disclosure as described above are not limited to the above-described embodiments and those shown in the drawings, and various changes, modifications, or alterations may be made thereto without departing from the scope of the disclosure.

The invention claimed is:

1. A protective cover configured to protect an electronic device, the protective cover comprising:
   a first cover configured to be located on a front surface of an electronic device;
   a second cover connected with the first cover and configured to be located on a rear surface of the electronic device;
   a support seated on the second cover;
   a mount rotatably connected between the first cover and the second cover and configured to seat the rear surface of the electronic device and to mount the electronic device at various angles using a frictional force upon rotation; and
   a mounting hinge configured to provide the frictional force for rotatably coupling and mounting the mount at various angles between the mount and the support.

2. A protective cover configured to protect an electronic device, the protective cover comprising:
   a first cover configured to be located on a front surface of an electronic device;
   a second cover connected with the first cover and configured to be located on a rear surface of the electronic device;
   a mount rotatably connected between the first cover and the second cover and configured to seat a rear surface of at least a portion of the electronic device and to mount the electronic device at various angles using a frictional force upon rotation;
   a support seated on the second cover and configured to rotatably support the mount; and
   a mounting hinge configured to provide the frictional force for rotatably coupling and mounting the mount at various angles between the mount and the support.

3. The protective cover of claim 2, wherein the mounting hinge includes a pair of first hinge members coupled and fixed to both sides of the mount and a pair of second hinge members coupled and fixed to a pair of side arms of the support, rotatably coupled with the pair of first hinge members and configured to adjust rotation of the first hinge members to provide various mounting angles of the mount using the frictional force according to the coupling.

4. The protective cover of claim 3, wherein the first hinge member has a first fixing member at a first end thereof and a rotational protrusion at a second end thereof, which is opposite to the first end, wherein the first fixing member is coupled and fixed to a first fixing hole formed at each of both sides of the mount, wherein the second hinge member has a second fixing member at a first end thereof and a rotational groove at a second end thereof, which is opposite to the first end, wherein the second fixing member is coupled and fixed to a second fixing hole formed at each of the pair of side arms of the support, and the rotational groove is coupled to the hinge protrusion and is configured to produce the frictional force against the hinge protrusion to be able to adjust the rotation of the first hinge member to provide various mounting angles of the mount.

5. The protective cover of claim 2, wherein the mount is formed to be smaller than the first and second covers.

6. The protective cover of claim 2, wherein the support includes polyurethane (PU).

7. The protective cover of claim 2, wherein the mount includes a seating member configured to seat a rear surface of the electronic device.

8. The protective cover of claim 7, wherein the seating member includes a suction sheet.

9. The protective cover of claim 2, further comprising a hinge insertion space between the first and second covers to insert the mounting hinge.

* * * * *